Feb. 21, 1928.
E. HAAGN
1,660,159
PRODUCTION OF ALLOYS OF THE PLATINUM GROUP
Filed Feb. 9, 1926
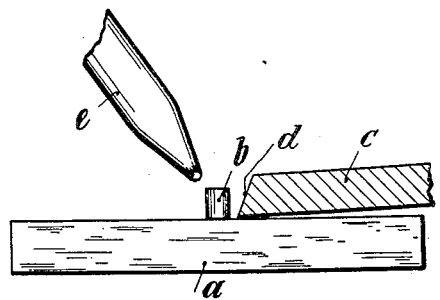
Inventor:
Ernst Haagn
by
Lorra, Kehlenbeck & Farley
Attorneys.

Patented Feb. 21, 1928.

1,660,159

UNITED STATES PATENT OFFICE.

ERNST HAAGN, OF HANAU-ON-THE-MAIN, GERMANY, ASSIGNOR TO W. C. HERAEUS GESELLSCHAFT MIT BESCHRANKTER HAFTUNG, OF HANAU-ON-THE-MAIN, GERMANY.

PRODUCTION OF ALLOYS OF THE PLATINUM GROUP.

Application filed February 9, 1926. Serial No. 86,968.

The process of melting alloys of the platinum group such as platinum-osmium or osmium-iridium alloys having extreme hardness, capacity of being united with other metals and non-corrodibility and especially adapted for the tips of gold pens, have been carried out so far in the following way. A small pearl or bugle of said alloys was produced from a mixture of the pulverized components. A small cylinder of for instance one gram weight, compressed from said mixture of powdered metals, was placed on a block of graphite and an iridium electrode placed above the cylinder to form an electric arc, the graphite forming the other electrode. Thereby first the upper half of the cylinder was molten, the cylinder was then reversed and the other half of it treated in the same way and thereupon the product was granulated.

With this process, part of the product was porous and showed sometimes holes or inequalities of structure. The good conductivity of heat connected with the development of carbon oxide from the graphite was the reason of these defects.

Now my invention consists in avoiding the said drawbacks by placing the said compressed body to be melted on a block or plate of a material, for instance calcium oxide, less conductive of heat than graphite, and not developing obnoxious gases. Two iridium electrodes are employed, whereof one is placed parallel and adjacent to the supporting block or plate and the other one with its tip diagonally opposite to the first electrode, so that an inclined arc is formed covering the body of platinum or the like.

Hereby the metal of the platinum group or its alloys may be melted in one operation and any porosity is avoided.

In the annexed drawing $a$ is the supporting plate, $b$ the body to be melted, $c$ the one electrode provided with a suitably inclined front face $d$, to get the electric arc into the most effective position with relation to the other electrode $e$ which is inclined diagonally with respect to said face $d$.

What I claim is:

1. An apparatus for melting small bodies of pulverized metals of the platinum group or their alloys in the electric arc, consisting of a supporting plate of calcium oxide and means to apply one electrode parallel and adjacent to the surface of the plate and the other electrode diagonally opposite the first electrode.

2. An apparatus for melting small bodies of pulverized metals in the electric arc, consisting of a supporting plate of calcium oxide and means to apply one electrode parallel and adjacent to the surface of the plate and the other electrode diagonally opposite the first electrode.

In testimony that I claim the foregoing as my invention, I have signed my name this 22d day of January, 1926.

ERNST HAAGN.